US012629851B2

(12) United States Patent
Frohne-Brinkmann et al.

(10) Patent No.: US 12,629,851 B2
(45) Date of Patent: May 19, 2026

(54) KNIFE

(71) Applicant: MARTOR KG, Solingen (DE)

(72) Inventors: Norbert Frohne-Brinkmann, Wuppertal (DE); Björn Weigle, Düsseldorf (DE)

(73) Assignee: MARTOR KG, Solingen (DE)

(*) Notice: Subject to any disclaimer, the term of this patent is extended or adjusted under 35 U.S.C. 154(b) by 311 days.

(21) Appl. No.: 18/203,196

(22) Filed: May 30, 2023

(65) Prior Publication Data

US 2024/0091965 A1 Mar. 21, 2024

(30) Foreign Application Priority Data

Jun. 8, 2022 (DE) ..................... 10 2022 114 415.1

(51) Int. Cl.
*B26B 5/00* (2006.01)

(52) U.S. Cl.
CPC .................................... *B26B 5/003* (2013.01)

(58) Field of Classification Search
None
See application file for complete search history.

(56) References Cited

U.S. PATENT DOCUMENTS 4,139,939 A * 2/1979 Crooks ..................... B26B 1/08 30/162
5,813,121 A 9/1998 Gringer
6,487,778 B1 * 12/2002 Gringer ................... B26B 5/003 30/162
9,409,299 B2 8/2016 Segler
10,220,527 B1 * 3/2019 Marfione .................. B26B 1/08
2006/0048392 A1 3/2006 Okada
2014/0059864 A1 * 3/2014 Segler ...................... B26B 5/002 30/162
2014/0182140 A1 * 7/2014 Rosenhan ............... B26B 5/003 30/162
2015/0013171 A1 1/2015 Wu (Continued)

FOREIGN PATENT DOCUMENTS

CN 201792343 U * 4/2011 ............. B26B 5/003
CN 103659849 A 3/2014

(Continued)

OTHER PUBLICATIONS

English translation of DE-102017009630-A1, dated Apr. 18, 2019.*

(Continued)

*Primary Examiner* — Hwei-Siu C Payer

(74) *Attorney, Agent, or Firm* — LUCAS & MERCANTI, LLP; Klaus P. Stoffel

(57) ABSTRACT

A knife including a housing and a blade carrier, in which a blade can be fastened and which is movable in the housing between a safety position in which the blade carrier is arranged in a rear position such that the blade does not project beyond protective components formed by the housing and at least one cutting position in which the blade projects beyond the protective components. A spring mechanism is arranged between the housing and the blade carrier and loads the blade carrier into the safety position. The blade carrier includes first locking element releasably engageable with second locking element on the housing to lock the blade carrier in at least one safety position and/or in at least one cutting position.

14 Claims, 14 Drawing Sheets

(56) References Cited

U.S. PATENT DOCUMENTS

| | | | | |
|---|---|---|---|---|
| 2019/0224861 | A1 | 7/2019 | Bloch | |
| 2020/0122346 | A1 | 4/2020 | Vreeland | |
| 2020/0156269 | A1 | 5/2020 | Sullivan | |
| 2021/0323178 | A1 * | 10/2021 | Marovic | B26B 5/002 |
| 2022/0193937 | A1 | 6/2022 | Rosenhan | |
| 2022/0347869 | A1 * | 11/2022 | Gallegos | B26B 5/003 |
| 2024/0091965 | A1 * | 3/2024 | Frohne-Brinkmann | B26B 5/003 |

FOREIGN PATENT DOCUMENTS

| | | | | |
|---|---|---|---|---|
| CN | 104902830 | A | 9/2015 | |
| CN | 112638601 | A | 4/2021 | |
| DE | 102546 | C | 6/1898 | |
| DE | 3325552 | A1 | 1/1985 | |
| DE | 202005018728 | U1 | 4/2007 | |
| DE | 102012017431 | A1 | 5/2014 | |
| DE | 102017009630 | A1 * | 4/2019 | B26B 5/003 |
| DE | 102021125354 | A1 | 4/2022 | |
| GB | 2536039 | A * | 9/2016 | B26B 5/003 |
| WO | 2014089369 | A1 | 6/2014 | |

OTHER PUBLICATIONS

English translation of CN-201792343-U, dated Apr. 13, 2011.*
English translation of DE-102021125354-A1, dated Apr. 28, 2022.*
European Search Report for EP 23 17 3551 Dated Oct. 5, 2023, 1 Page.
Chinese Search Report Dated Jul. 30, 2025, 1 Page.

* cited by examiner

KNIFE

CROSS-REFERENCE TO RELATED APPLICATIONS

The present application claims priority of DE 10 2022 114 415.1, filed Jun. 8, 2022, the priority of this application is hereby claimed and this application is incorporated herein by reference.

BACKGROUND OF THE INVENTION

The invention relates to a knife.

Such a knife is known from obvious prior use. It comprises a housing and a knife carrier movable in the housing between a safety position and at least one cutting position. A spring loads the blade carrier into the safety position. In the cutting position, the blade emerges from a front housing opening and projects with a blade exit length over the housing, so that a cutting operation is possible. The blade exit length can be adjusted by pushing the blade carrier forward on an operating part. During the cutting process, the blade carrier had to be held in the cutting position.

U.S. Pat. No. 5,813,121 discloses a knife comprising a housing and a blade carrier slidably mounted in the housing. The blade carrier is movable between a rear and a front position. In the rear position the blade is retracted into the housing, while in the front position the blade projects out of the housing. According to one embodiment, the blade carrier can be latched at latch position of the housing. According to an alternative embodiment, the blade carrier is spring-loaded and must be moved against spring force into the cutting position by the user.

US 2015/0013171 A1 describes a knife comprising a housing and a blade carrier which is movable in the housing. The blade carrier can be moved in the longitudinal direction of the housing when actuated. A spring is connected to the housing and the blade carrier. By means of a function switch, a choice can be made between a locking mode and a retracting mode.

SUMMARY OF THE INVENTION

It was the object of the invention to create a knife that is further improved with regard to its handling.

The knife comprises a housing. A blade carrier, in which a blade can be fastened, is movable on the housing between a safety position, in which the blade carrier is arranged in a rear position in such a way that the blade does not project beyond protective means formed by the housing, and at least one cutting position, in which the blade—i.e. also a cutting edge of the blade—projects beyond the protective means. A cutting operation can be carried out in the cutting position. Within the meaning of the invention, protective means are means which prevent the user from coming into contact with the cutting edge of the blade and injuring themselves on it.

Spring means are arranged between the housing and the blade carrier and load the blade carrier into the safety position. The blade carrier comprises first locking means releasably engageable with second locking means formed on the housing to lock the blade carrier in the safety position and/or in at least one cutting position. The locking means form, for example, a lock with which the blade carrier can be locked in at least two cutting positions.

An advantage of the combination of features according to the invention is that the blade carrier can be locked in at least one cutting position and therefore does not have to be held against the force of the spring. In addition, the locking allows the blade carrier to be secured in the safety position, for example.

The first locking means comprise at least one latch movable between a latch position and a release position. In the latch position, a movement of the blade carrier is locked, it can therefore not move in one of two opposite directions of its movement path. In the release position, the blade carrier is freely movable in both directions of movement. The locking means can comprise more than one latch, e.g. two latches.

The latch can be moved, e.g. guided, in translation between the latch position and the release position. For example, the latch is movable along a path that has substantial movement components that are directed transversely to the directions of movement of the blade carrier. The latch is e.g. guided on a straight or a curved path of movement.

The second locking means comprise at least one, in particular at least two latch seats. The second locking means comprise, for example, a plurality of latch seats. The blade carrier can then be locked with different blade exit lengths. Each latch seat corresponds, for example, to a certain blade exit length with the proviso that in at least one safety position the blade exit length is zero. The latch seat is formed, for example, by a recess or a projection of the housing. The recess or projection forms, for example, abutment surfaces for the bolt so that movement of the blade carrier is prevented. For example, the latch has a complementary structure that engages positively with the latch seat in the latch position.

The housing comprises a slot-like lateral opening, which extends in the direction of movement of the blade carrier, wherein the lateral opening is penetrated by a connection between the blade carrier and an actuating part. The blade carrier can be easily operated by means of the lateral opening. The lateral opening extends in the direction of movement of the blade carrier. The actuating part is e.g. motion-connected to the blade carrier.

The second locking means are e.g. adjacent to the lateral opening and offset in the direction of movement of the blade carrier. It is then possible to lock the blade carrier in the set position. The locking is easy to perform because the first locking means and the second locking means are close to each other.

The second locking means are arranged on the housing, e.g. visible from the outside. The user can visually track the locking in this case. It is therefore easy to determine whether the latch position is securely set. In this way, the safety of the knife is increased, as it is less likely that false locks can occur. The embodiment also offers, for example, the option of providing a scale on the housing from which the blade exit length can be read. This makes it easier to set a desired blade exit length.

The first locking means can be locked, for example, with a securing device. A securing device can lock the first locking means to prevent unintentional release of the latch from the second locking means. The securing device has, for example, a blocking means which is movable, for example, on a path on which the blocking means are movable. The path is provided, for example, with a latch seat into which the blocking means latch in the latch position. In order to then move the first locking means into the release position and thereby move the blocking means out of the latch seat, an additional force must be applied.

The direction of force to release the locking means from the latch seat is e.g. different from the direction of movement of the first locking means between the latch position and the release position. A force acting on the latch in the direction of the release position can thus not unintentionally move the latch into the release position. The blocking means is made of metal, for example, in order to prevent wear or deformation and the resulting possible loss of function.

The first locking means comprise, for example a pressure piece which is connected for movement to the latch and is loaded by spring means against a securing surface of the blade carrier. The latch cannot easily be released from the latch position because the pressure piece has to be moved over e.g. a threshold or a step to release the latch.

The securing surface comprises, for example, at least one position region for the pressure piece. For example, position regions are provided for the latch position and for the release position. This means that the latch cannot be moved out of position easily. For example, a resistance has to be overcome to move the latch between the latch position and the release position.

At least a first position region is, for example by means of a threshold or a step, separated from a second position region by means of a step and wherein the threshold or the step must be overcome during the movement between the first position region and the second position region. As mentioned above, the direction of force to overcome the step can be different from the direction of force to move the latch. Instead of a step, for example, a slope is alternatively formed between the first position region and the second position region.

The housing forms guide means, for example, for guiding the blade carrier. For example, the housing forms guide structures to guide the blade carrier together with the blade. E.g. the guide is formed by a different material in relation to a part of the housing. E.g. the blade and possibly part of the blade carrier is guided in a metal guide. The guide means can be connected to each other e.g. by fastening or by overmolding by means of plastic.

The housing comprises, for example, a guide rail as a guide means in which the blade carrier is guided. For example, the guide rail can essentially guide the blade. It can be designed as a metal part, for example. However, other suitable materials can also be used as alternatives. For example, the guide rail is designed in such a way that the user cannot touch the cutting edge of the blade when the cutting edge is located inside the guide rail. The guide rail therefore also has a safety function.

A locking part can be held on the housing, with which a rear opening of the guide rail can be blocked. The closing part is movable, for example, between an open position and a closed position. To remove the blade carrier, the closing part can be moved to the open position, for example. In the closed position, the blade carrier cannot pass through the rear opening.

The housing comprises, for example, a sleeve region by which the guide rail is at least partially received. For better manageability, the sleeve region forms, for example, a grip region on which the knife can be gripped. The sleeve region is made of plastic, for example. For example, the guide rail is overmolded with plastic or the guide rail is pressed into a sleeve region. In the last-mentioned embodiment, the sleeve region can also be made of plastic. This allows simple production and flexible shaping of the knife.

The second locking means are formed e.g. in the sleeve region and/or in the guide rail. When the second locking means are formed in the sleeve region, they are easily moldable with the sleeve region. When the second locking means are formed in the guide rail, they are arranged adjacent to the lateral opening, for example. The above-mentioned formation on the sleeve region or in the guide rail facilitates the visual perceptibility of the second locking means.

For example, one end of the spring is connected to coupling means which are engageable with coupling means of the blade carrier. For example, the spring is retained with one end region on the housing and with another end region on a carriage. The carriage comprises coupling means, which can be releasably engaged with coupling means of the blade carrier. The coupling means can, for example, be designed in such a way that when the blade carrier is moved in the direction of the cutting position, the carriage and thus the spring end attached thereto is carried along, wherein the spring is tensioned. It is then easy to uncouple the blade carrier from the spring and remove it from the housing, e.g. for a blade change.

Exemplary embodiments of the invention are described in the following figure description, additionally with reference to the drawings. For the sake of clarity—also insofar as different embodiments are concerned—identical or comparable parts or elements or regions are designated with the same reference numerals, sometimes with the addition of lowercase letters.

Features described only in relation to one embodiment may also be provided in any other embodiment of the invention within the scope of the invention. Such modified embodiments—even if not shown in the drawings—are covered by the invention.

All disclosed features are essential to the invention in themselves. The disclosure of the application hereby also includes in full the disclosure content of associated priority documents (copy of the prior application) as well as cited publications and the described prior art devices, also for the purpose of including individual or several features of these documents in one or several claims of the present application.

DETAILED DESCRIPTION OF THE INVENTION

Figure 1:
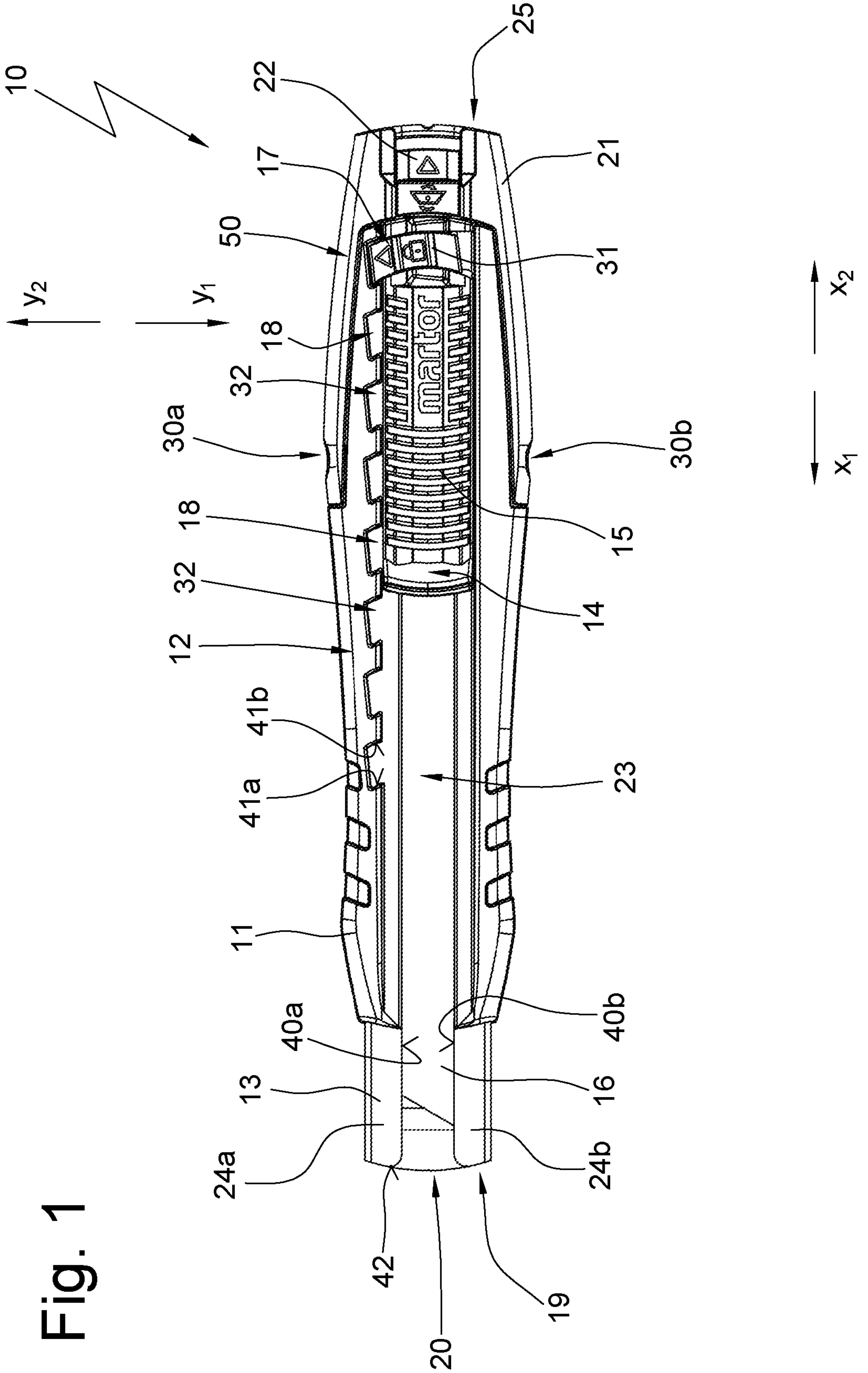
FIG. 1 shows a side view of the knife in the safety position.

A knife as a whole is designated with the reference numeral 10 in the figures. The knife comprises a housing 11 with a sleeve region 12 and a guide rail 13 which is partially surrounded by the sleeve region 12.

FIG. 1 shows a side view of the knife. It can be seen that the guide rail 13 is designed to be C-shaped and has folds 24*a* and 24*b* with free ends 40*a* and 40*b* forming a lateral opening 23 between them. When a blade 16 is fully inside the guide rail 13, a cutting edge 39 is inaccessible to the user. The blade 16 is guided between a wall 24 and the folds 24*a* and 24*b*.

The housing 11 further comprises the sleeve region 12, which forms a grip region on which the knife 10 can be gripped. The sleeve region 12 omits the lateral opening 23 and a range of movement of an actuator 15 for a blade carrier 14 in which the blade 16 is mounted. Adjacent to the free end 40*a*, a plurality of second locking means 18 is formed in the sleeve region 12 of the housing 11 offset along the lateral opening 23. In the present example, the second locking means 18 are in the form of recesses 32. The recesses 32 have opposing abutment surfaces 41*a*, 41*b*.

At a rear end region 25, the housing 11 has a closing part 21 with which a rear opening of the guide rail 13 (not shown in FIG. 1) can be closed. The closing part 21 forms swivel joints 30*a* and 30*b* with the housing 11. In this way, the closing part 21 can be pivoted between a closed position, in which access to the rear opening is blocked, and an open position, in which the rear opening is passable. By means of a housing latch 22 of the closing part 21, which cooperates with locking means on the sleeve region 12, the closed position can be locked and unlocked.

In the guide rail 13 the blade 16 and a part of the blade carrier 14 are guided movably in the directions x1 and x2. By means of the actuator 15, which is connected to or formed by the blade carrier 14, the blade carrier 14 can be adjusted by the user in the directions x1 and x2 relative to the housing 11. During movement, the blade carrier 14 is guided by the guide rail 13. In this way—depending on how far the blade carrier 14 is moved in the direction x1—different blade exit lengths l can be set, wherein "l" denotes the blade length that projects beyond a front edge 42 of the guide rail 13 (see FIGS. 2 to 5). The blade 16 exits from a front opening 20 at a front end region 19 of the housing 11.

A spring 26 (not visible in FIG. 1, see FIG. 2) loads the blade carrier 14 in the direction x2 into the safety position shown in FIG. 1, in which a cutting edge 39 of the blade 16 is not accessible to the user. The spring 26 is attached to the housing 11 by an attachment 27 and forms an attachment 28 with a carriage 29. The attachment 28 and the carriage 29 cannot be seen in FIG. 2. As soon as the force applied by the user in the direction x1, which holds the blade carrier 14 in a cutting position, decreases, the blade carrier 14 is pulled by the spring 26 in the direction x2 into the safety position.

A locking device comprising first locking means 17 of the blade carrier 14 and second locking means 18 of the housing 11 can be used to lock the blade carrier 14 in one of a plurality of locking positions relative to the housing 11. The first locking means 17 comprise a latch 31 movable between a latch position and a release position. In the latch position, the latch 31 is engaged with one of the recesses 32. In the latch position, movement of the blade carrier 14 in one of the directions x1 and x2 is not possible. In the release position, the latch 31 is out of engagement with the recesses 32.

Since the recesses 32 are located to the side of the path of movement of the blade carrier 14, the latch 31 only has to cover a short distance between the latch position and the release position. As can be seen in the figures, the latch 31 has a curved longitudinal center axis and is movable along a correspondingly slightly curved path between the latch position and the release position. This has the advantage that the latch 31 can be moved in an ergonomically advantageous way and gives a peculiar visual impression.

Figure 2:
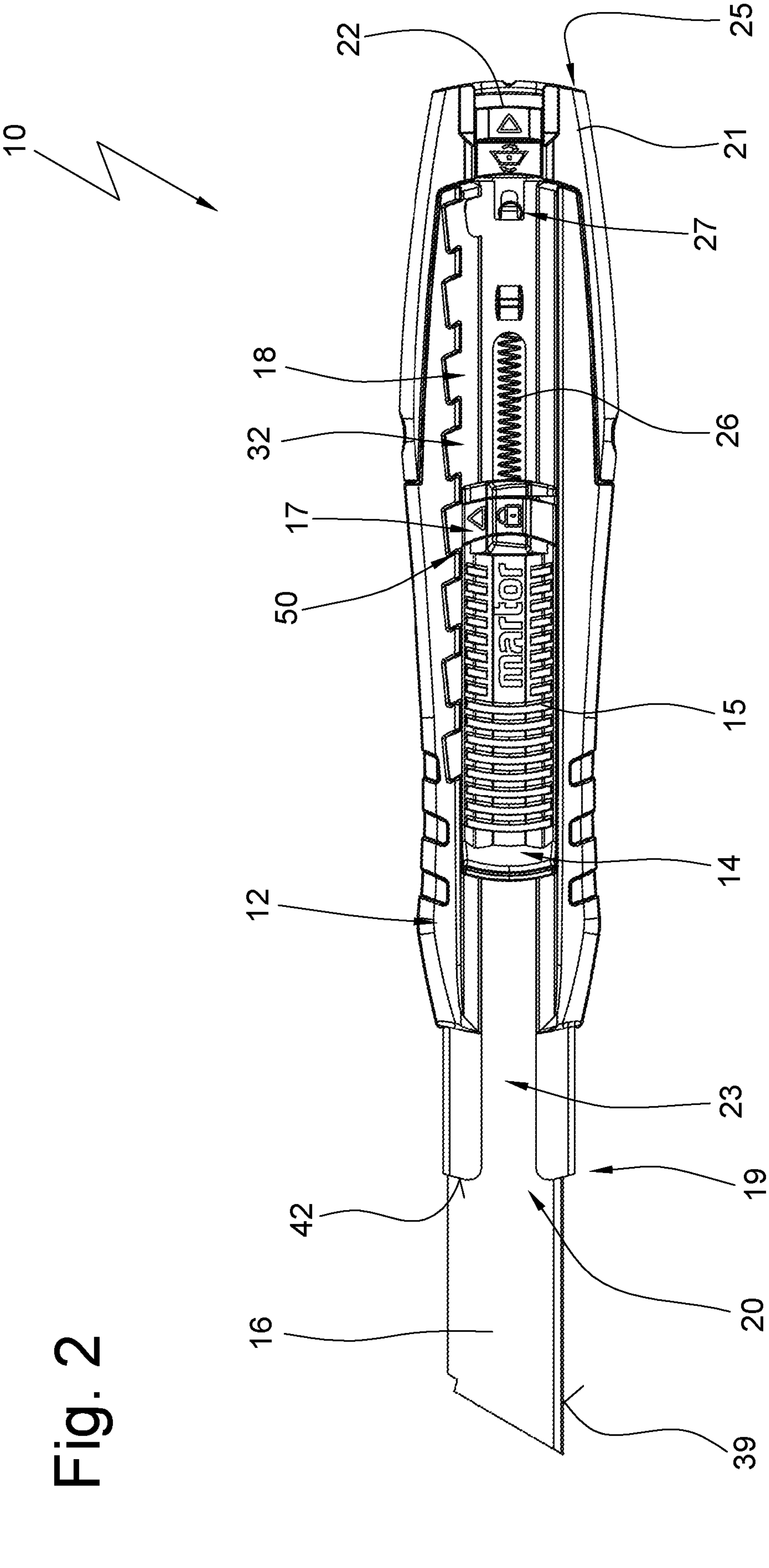
FIG. 2 shows a side view in a first cutting position, wherein the locking device is in the release position.
Figure 3:
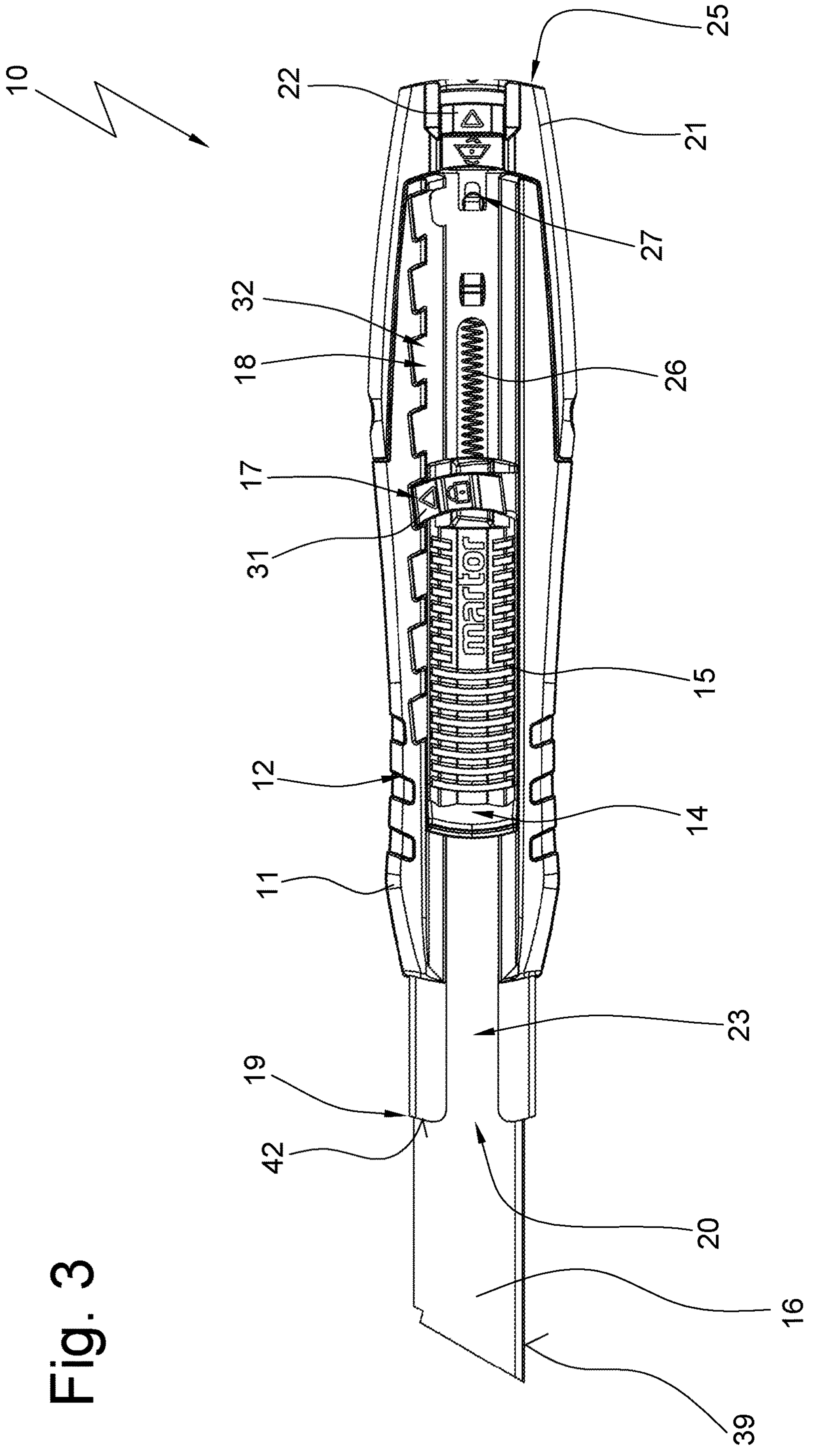
FIG. 3 shows a side view according to FIG. 2, wherein the locking device is set in the latch position.

According to FIG. 1, the blade carrier 14 is arranged in the safety position. The locking device is in the latch position. This means that the blade carrier 14 cannot be moved in the direction x1 into the cutting position. A movement in the direction x2 is not possible from the safety position anyway, as stop means of the blade carrier 14 as well as of the closing part 21 prevent this as long as the closing part 21 is in the closed position. In order for the blade carrier 14 to be movable, the latch 31 must be moved to the release position as shown in FIG. 2.

The locking device 50 (see FIGS. 17 and 18) comprises a securing device 62 for the latch 31 in the latch position. This prevents the latch 31 from unintentionally moving from the latch position to the release position. The securing device 62 comprises a pressure piece 33 which is loaded by a spring 35 in the direction z1 against a securing surface 36. The securing surface 36 comprises position regions 37 and 38, which are separated from each other by a step 43. The pressure piece 33 is motion-connected to the latch 31 so that it moves from the position region 37 to the position region 38 (see FIG. 18) when the latch 31 moves from the latch position to the release position. In doing so, the pressure piece 33 must overcome the step 43 while moving in the direction z2 against the spring force of the spring 35, for which an increased amount of force is necessary when adjusting the latch 31. This prevents unintentional movement.

Figure 6:
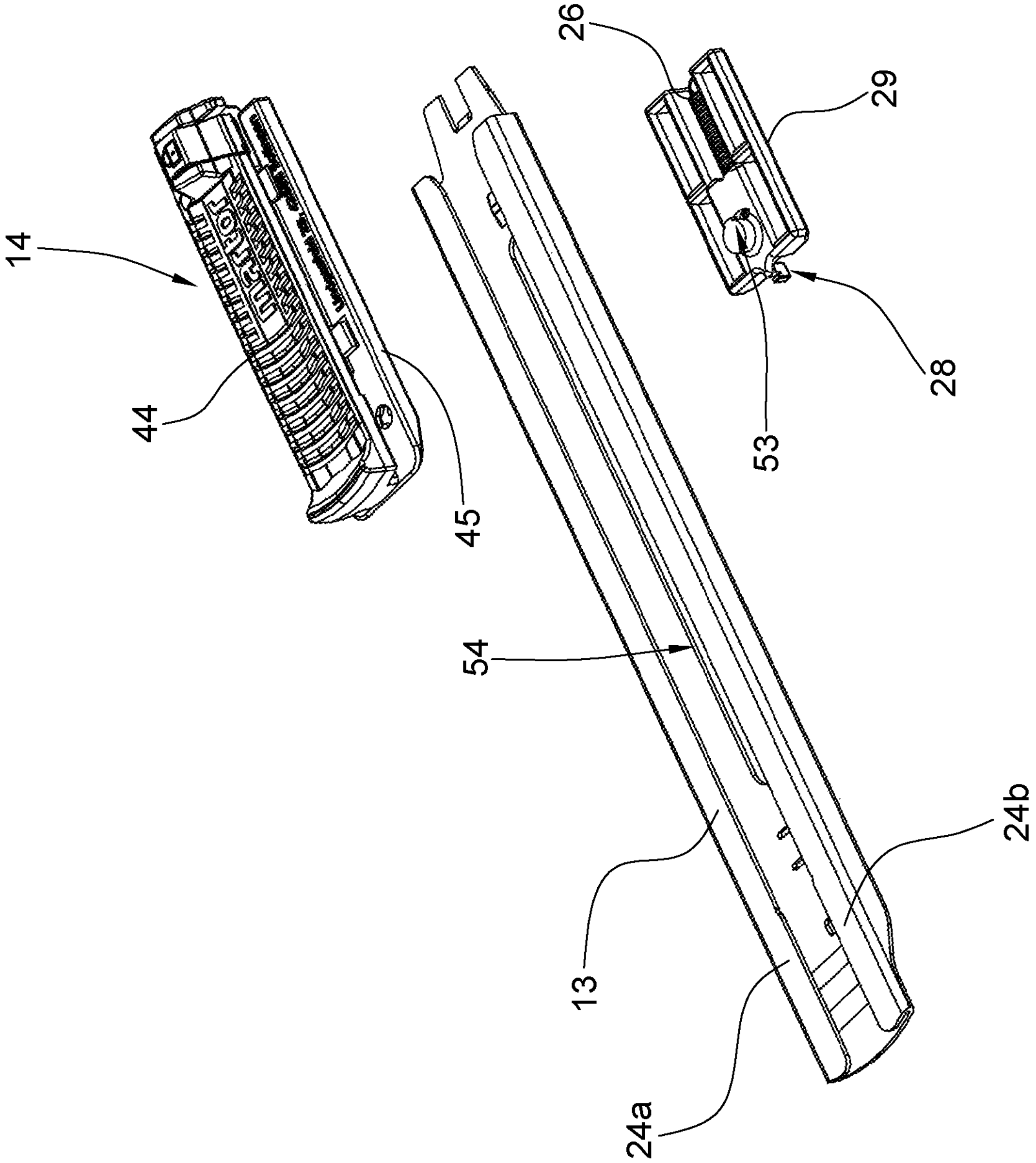
FIG. 6 shows an exploded illustration of the knife, wherein the sleeve region of the knife is not shown.

In FIG. 6, the guide rail 13 of the housing 11, the blade carrier 14 and a carriage 29 are shown in perspective. The sleeve region 12, the closing part 21 and the blade 16 are not shown in FIG. 6. The carriage 29 comprises a driver 53 which forms a coupling element which cooperates with a coupling element of the blade carrier 14. The attachment 28 formed on the carriage 29 allows an end region of the spring 26 to be attached to the carriage 29. A slot 54 can be seen in the guide rail 13, the function of which is explained below.

Figure 7:
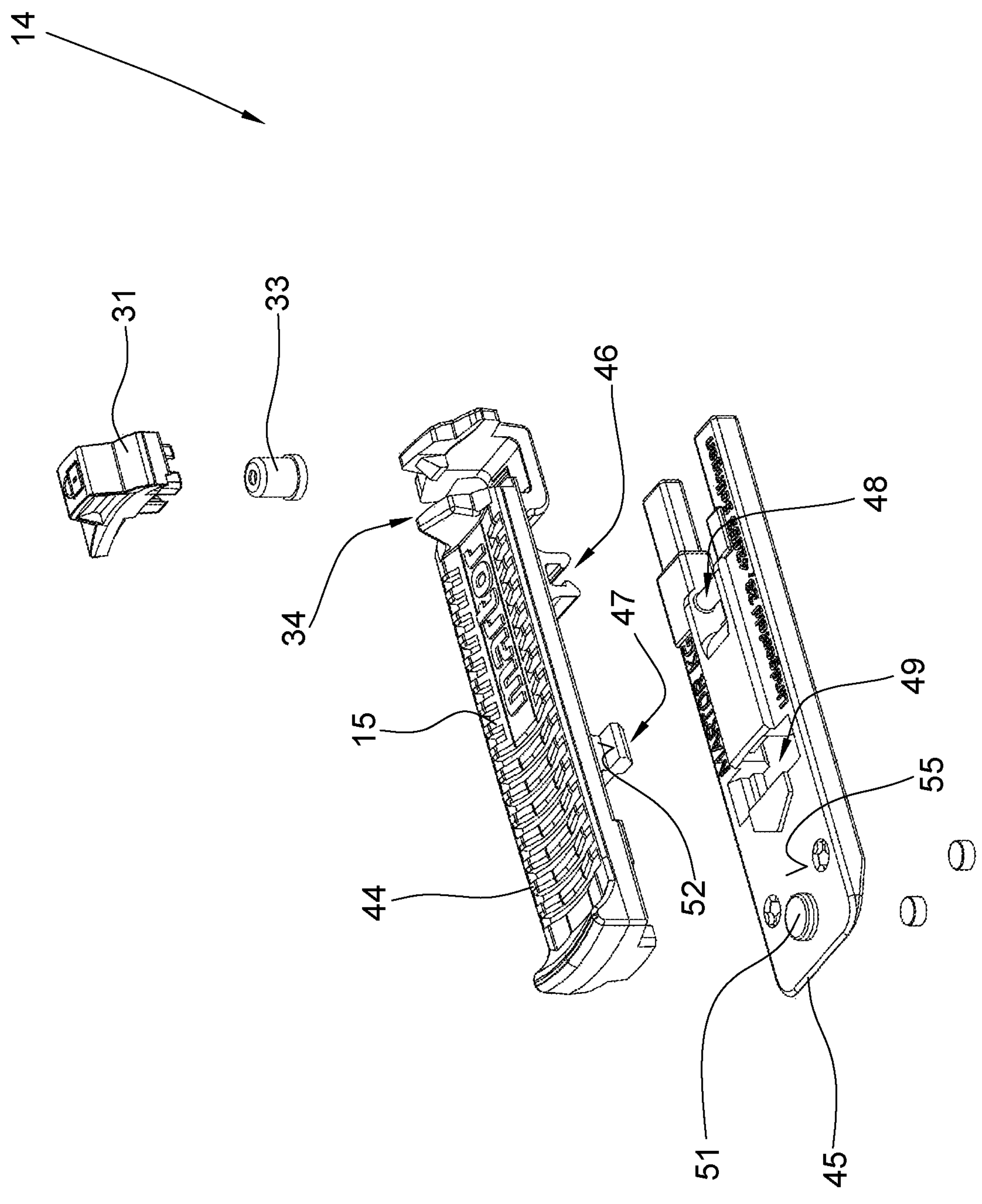
FIG. 7 shows an exploded illustration of the blade carrier.

FIG. 7 shows an exploded illustration of the blade carrier 14. The blade carrier 14 comprises an upper part 44 and a lower part 45. The upper part 44 has the actuator 15. Furthermore, the latch 31 and the pressure piece 33 are movably mounted in the latch seat 34 on the upper part 44. The spring 35 for loading the pressure piece 33 is not shown in FIG. 7. Retaining means 46, here in the form of latching arms, are also held on the upper part 44 and cooperate with the lower part 45.

A projection 47 of the upper part 44 comprises abutment surfaces 52, of which only one abutment surface 52 can be seen in FIG. 7. The abutment surfaces 52 engage under the folds 24*a* and 24*b* to prevent pivotal movement of the upper part 44 relative to the lower part 45 when the blade carrier 14 is in the guide rail 13.

The lower part 45 comprises mating retaining means 48, here in the form of a detent axle, designed to engage with the retaining means 46 to pivotally hold the upper part 44 together with the lower part 45. The lower part 45 is provided with a recess 49 for receiving the projection 47. Form-fitting means 51 are formed to positively retain the blade 16 on the lower part 45. In this exemplary embodiment, the form-fitting means 51 are in the form of a pin which is adapted to engage a recess in the blade 16.

The blade 16 may be held between a support surface 55 of the lower part 45 and a surface of the upper part 44 (not shown) when the blade carrier 14 is in a retaining position. The movement of the blade carrier 14 into a change position is only possible if the blade carrier 14 has previously been removed from the guide rail 13.

Figure 8:
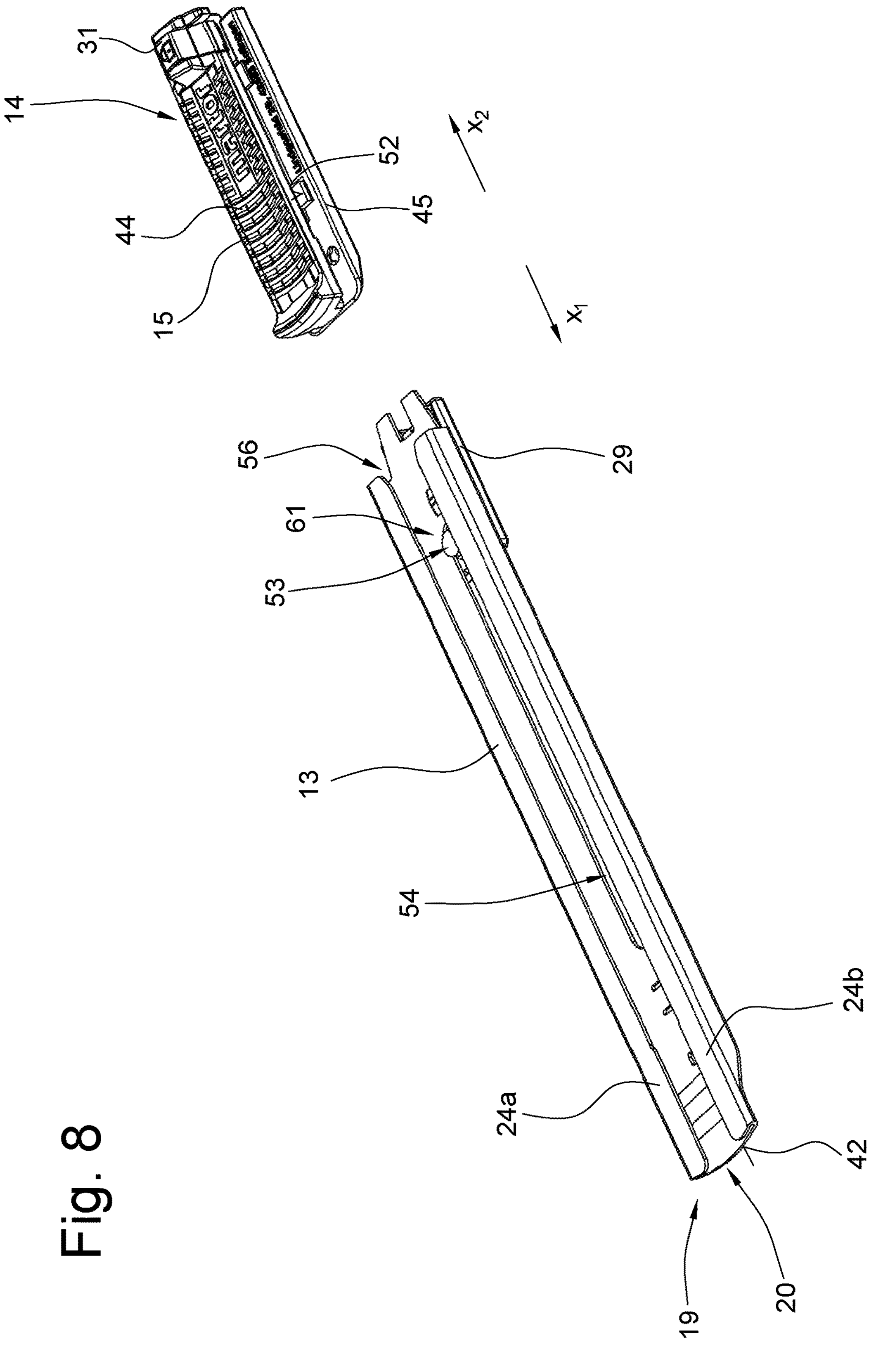
FIG. 8 shows a perspective illustration of the knife, wherein the sleeve region is not shown and the blade carrier is dismounted from the guide rail.

In FIG. 8, the carriage 29 is held on an underside of the guide rail 13 in such a way that the driver 53 engages through the slot 54 and projects into the path of movement of the blade carrier 14. The slot 54 defines the path of movement of the driver 53 and thus also of the carriage 29 connected to the driver 53. The blade carrier 14 can be inserted into the guide rail 13 in the direction x1 through an opening 56 at the rear end region 25 of the guide rail 13. If a driver surface of the blade carrier 14 comes into contact with the driver 53, the spring 26 is tensioned when the blade carrier 14 moves further in the direction x1 and a force acts on the blade carrier 14 in the direction x2.

Figure 9:
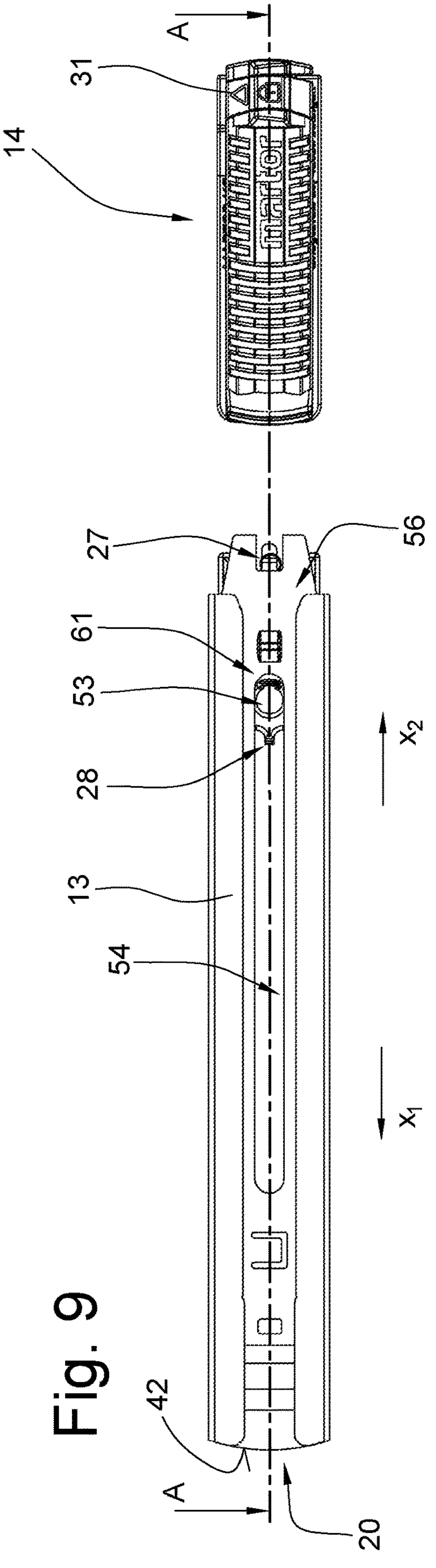
FIG. 9 shows a side view of the knife according to FIG. 8.

According to FIG. 9, the carriage 29 is mounted on the guide rail 13. For the sake of clarity, the sleeve region 12 of the knife 10 is not shown. The blade carrier 14 is dismantled and can be pushed into the guide rail 13 in the direction x1. The abutment surfaces 52 of the blade carrier 14 then engage under guide surfaces 57 of the guide rail 13 (see FIG. 10) and prevent movement of the blade carrier 14 into the open position.

Figure 10:
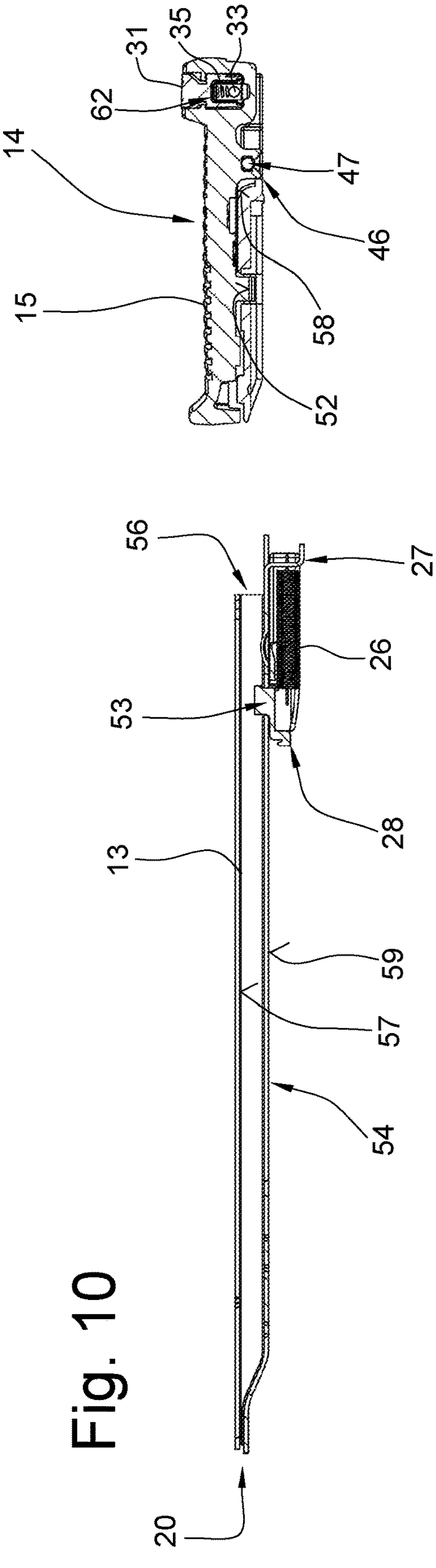
FIG. 10 shows a section view according to the sectional line A-A in FIG. 9.

FIG. 10 shows the driving surface 58 on the blade carrier 14, which interacts with the driver 53 of the carriage. The carriage 29 is configured to slide along a lower surface 59 of the guide rail 13. FIG. 10 shows the first attachment 27 by means of which the spring 26 is connected to the guide rail and the second attachment 28 of the spring 26 to the carriage 29. It is conceivable that the spring 26 is tensioned when the driver 53 moves in the direction x1. In the present example, the attachment 27 is formed by a hook element of the guide rail, into which an eyelet of the spring 26 is hooked. The attachment 28 is formed by a hook element of the carriage 29, to which an eyelet of another end region of the spring 26 is hooked.

Figure 11:
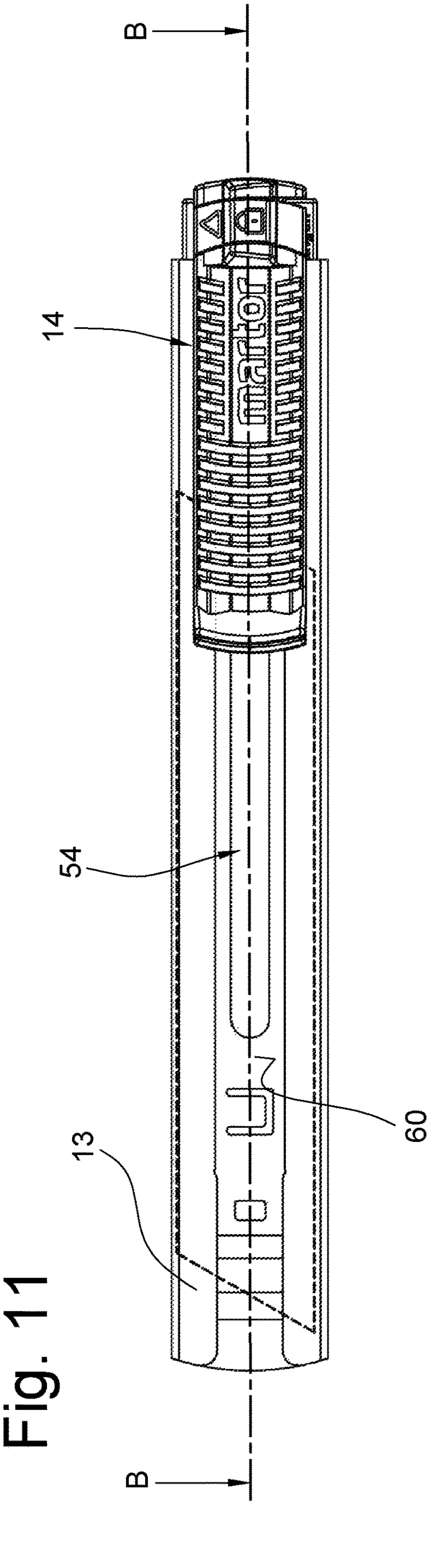
FIG. 11 shows a side view of the knife according to FIG. 1, wherein the sleeve region is not shown and the locking device is in the release position.
Figure 12:
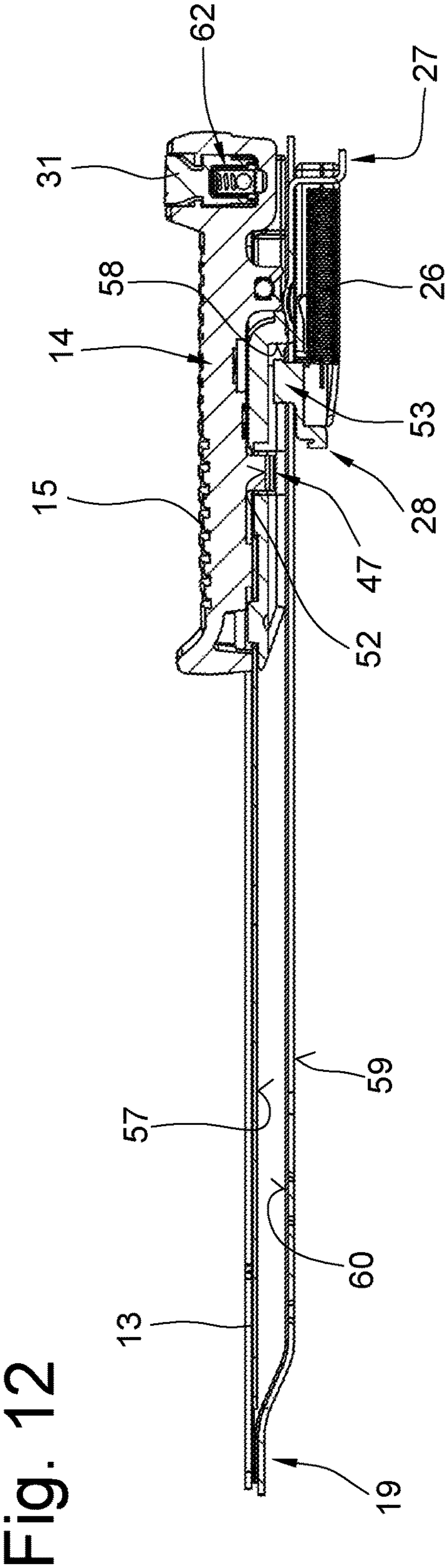
FIG. 12 shows a sectional view according to the sectional line B-B in FIG. 11.

According to FIG. 11, the blade carrier 14 is mounted in the guide rail 13. The blade 16 is shown in broken lines. The blade 16 (see FIG. 12) also slides on the guide surface 57. At the front end region 19, the distance between an inner surface 60 of the guide rail 13 and the lower surface decreases in order to guide the blade 16 in this region.

Figure 13:
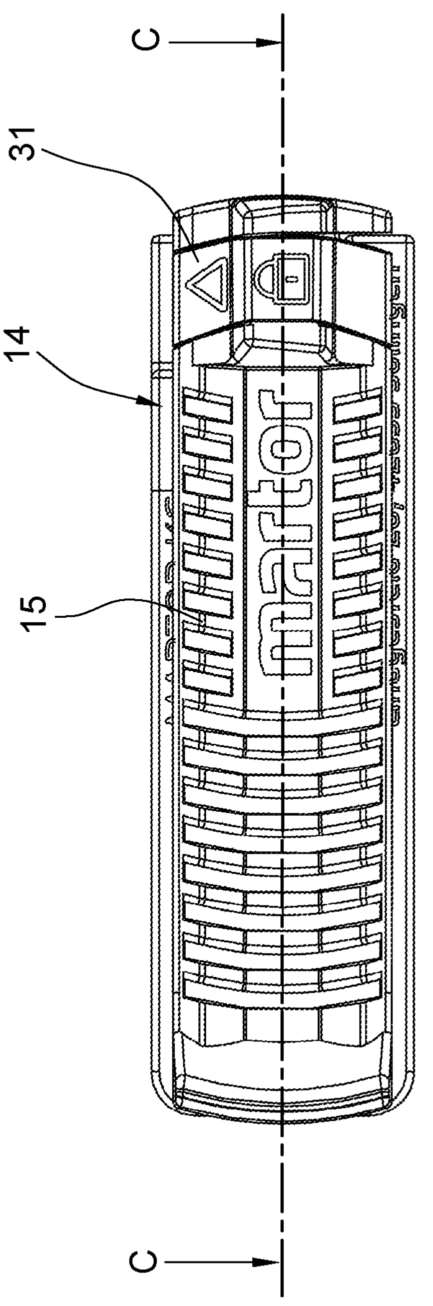
FIG. 13 shows a side view of the blade carrier and the carriage.
Figure 14:
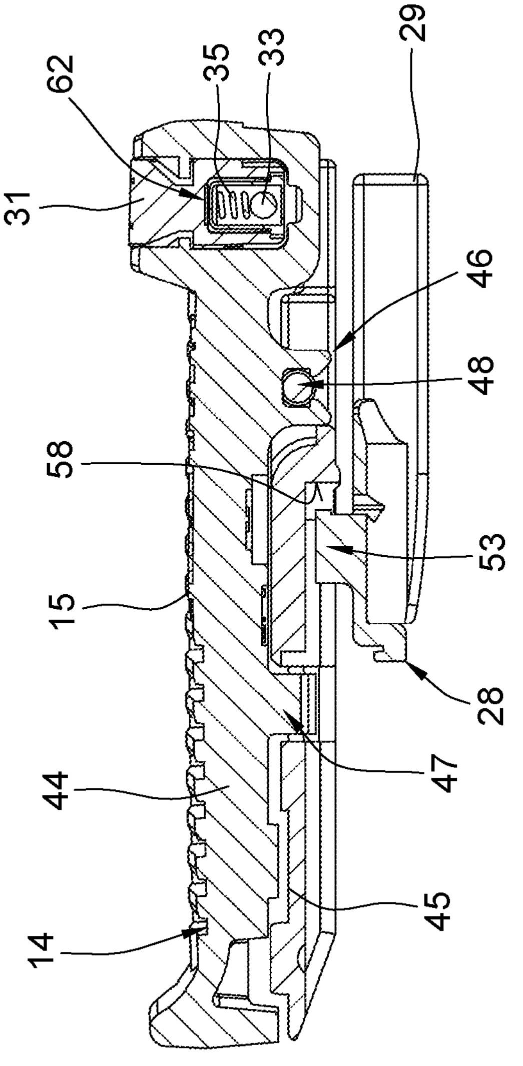
FIG. 14 shows a sectional view according to the sectional line C-C in FIG. 13.

In FIGS. 13 and 14, only the blade carrier 14 and the carriage 29 are shown enlarged.

Figure 15:
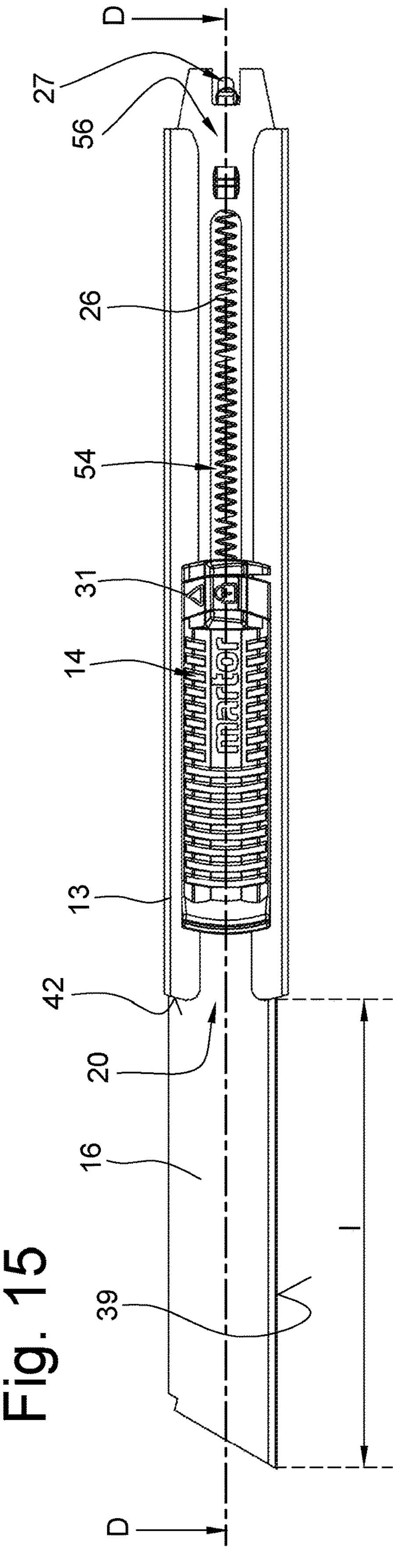
FIG. 15 shows a side view of the knife according to FIG. 4, wherein the sleeve region and the locking part are not shown.
Figure 16:
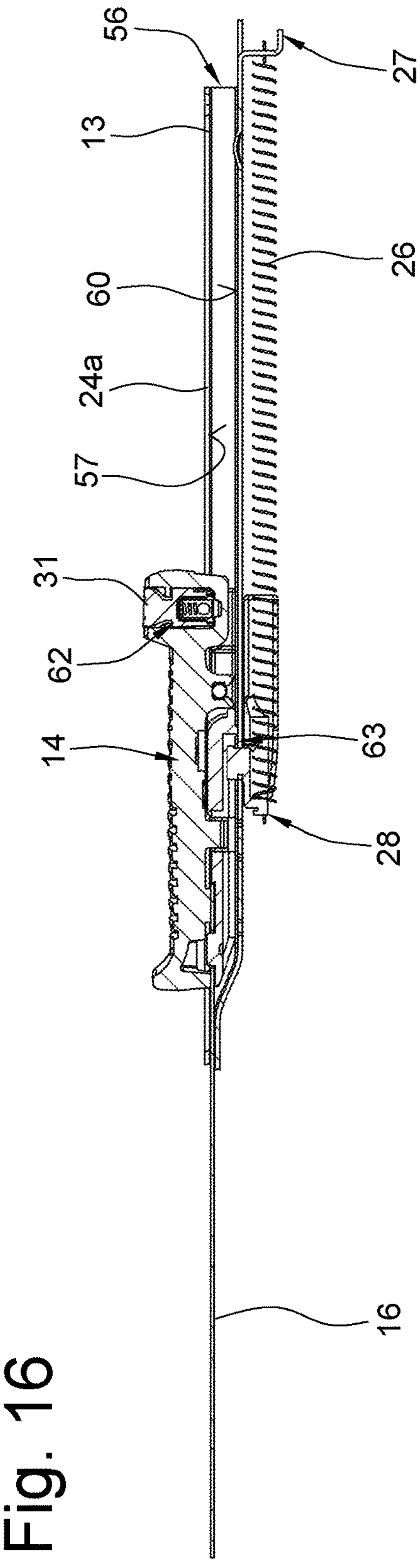
FIG. 16 shows a sectional view according to the sectional line D-D in FIG. 15.

In FIGS. 15 and 16 the blade carrier 14 is in the foremost position, so the blade 16 has the maximum exit length l. The driver 53 is moved to an end region 63 of the slot 54 opposite the end region 61. It can be seen that the spring 26 is positioned below the lower surface 59.

Figure 17:
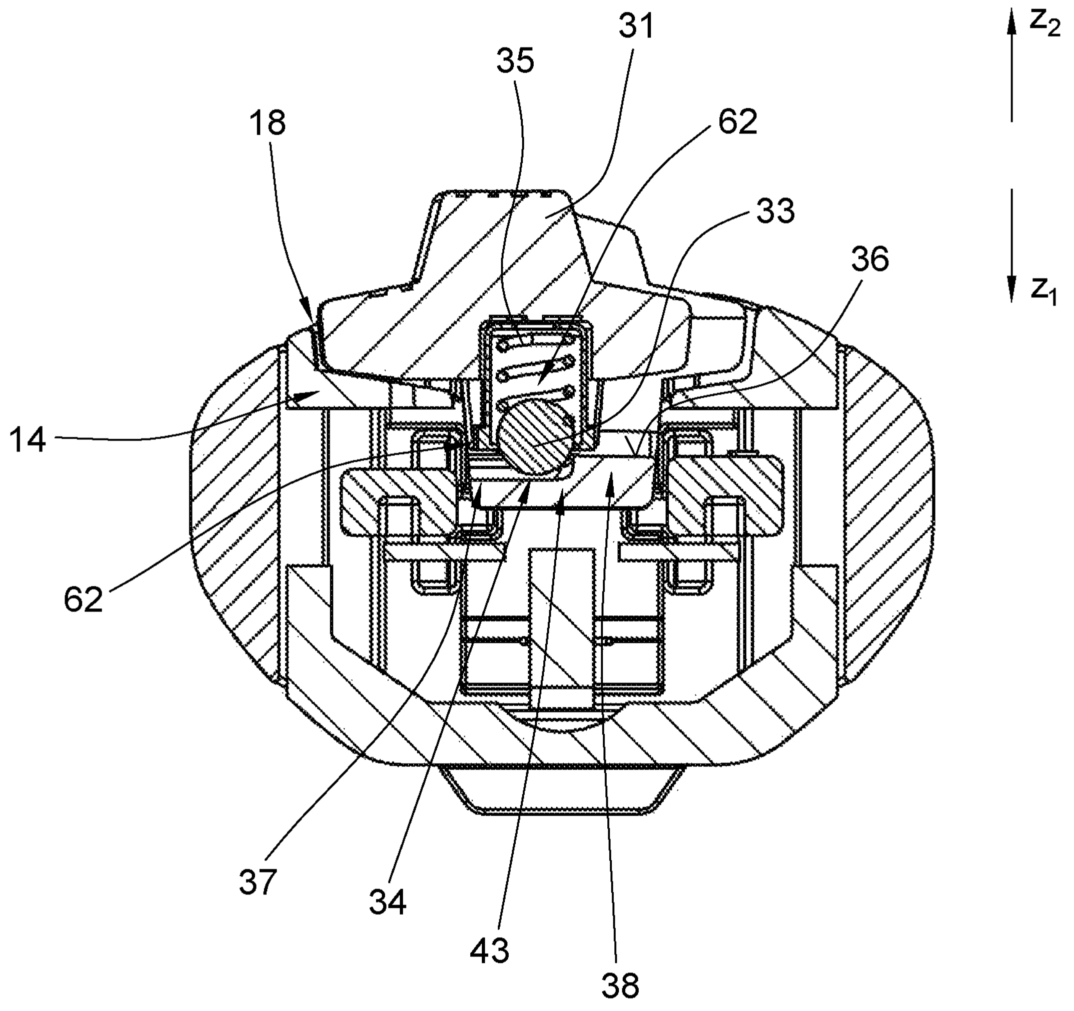
FIG. 17 shows a sectional view according to the sectional line E-E in FIG. 5.
Figure 18:
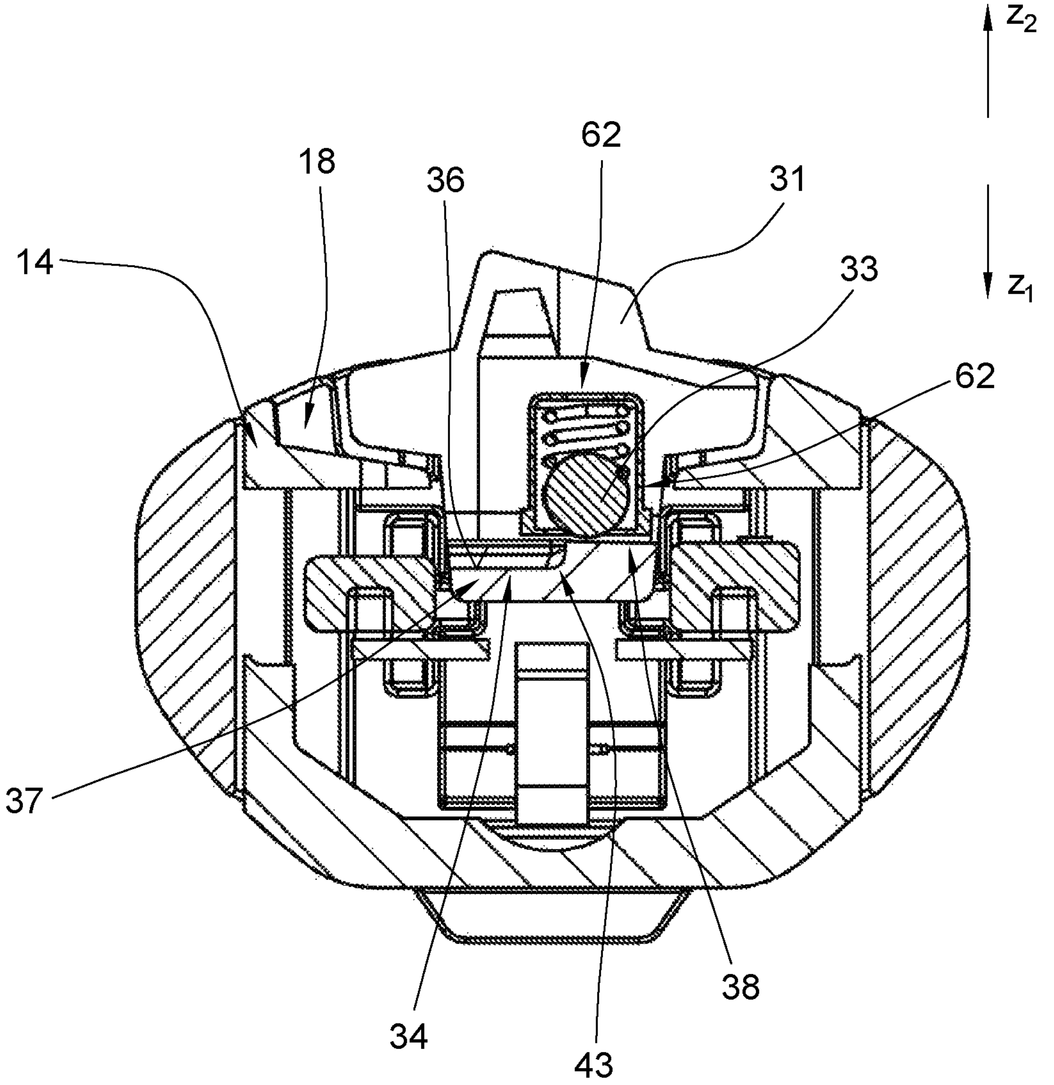
FIG. 18 shows a sectional view according to the sectional line F-F in FIG. 4.

The locking device can be seen in FIGS. 17 and 18. In FIG. 17, the latch 31 is engaged with one of the recesses 32 in the latch position. The pressure piece 33 is against the safety surface 36 of the blade carrier 14 by the spring 35. To move the latch 17 into the release position in the direction y1, the pressure piece 33 must be moved from the position region 37 to the position region 38 and thus overcome the step 43, which requires an increased exertion of force. According to FIG. 18, the latch 17 is in the release position. The pressure piece 33 is in contact with the position region 38. The movement of the latch 17 into the latch position in the direction y2 can be carried out without increased exertion of force because the pressure piece 33 is moved down the step 43.

Figure 4:
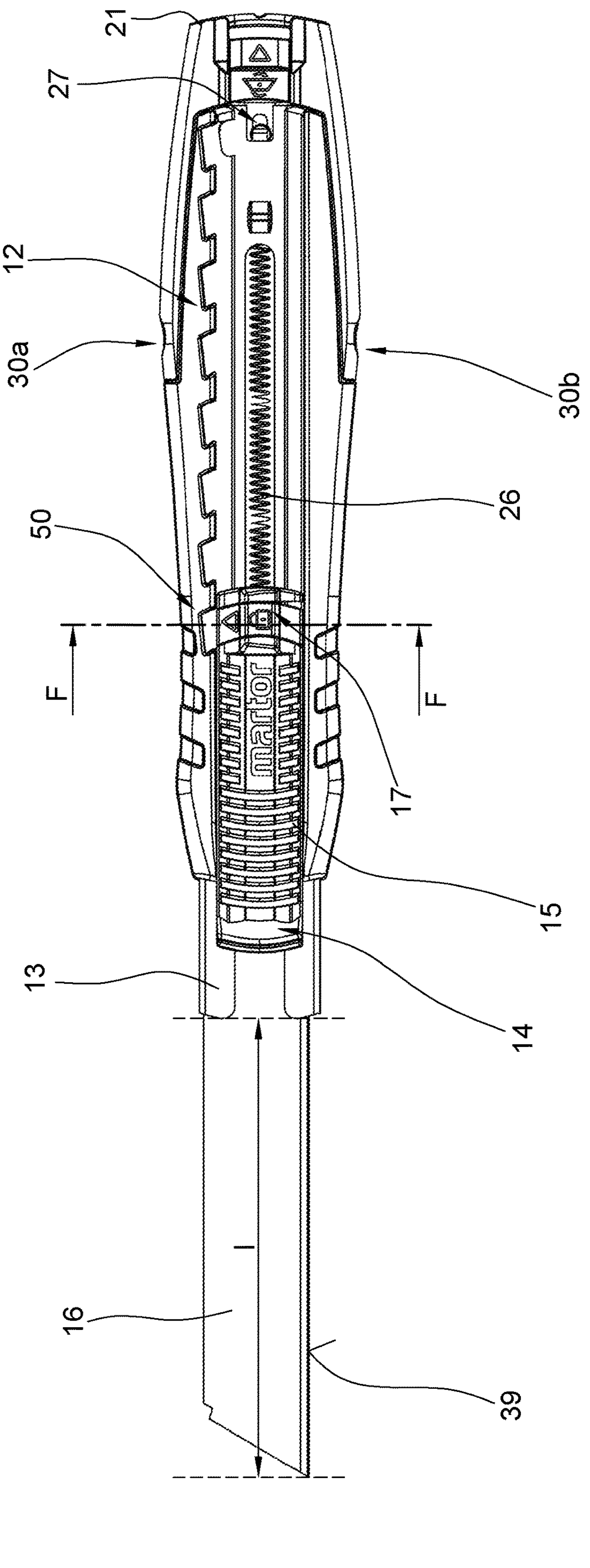
FIG. 4 shows a side view in a second cutting position, wherein the locking device is in the release position.
Figure 5:
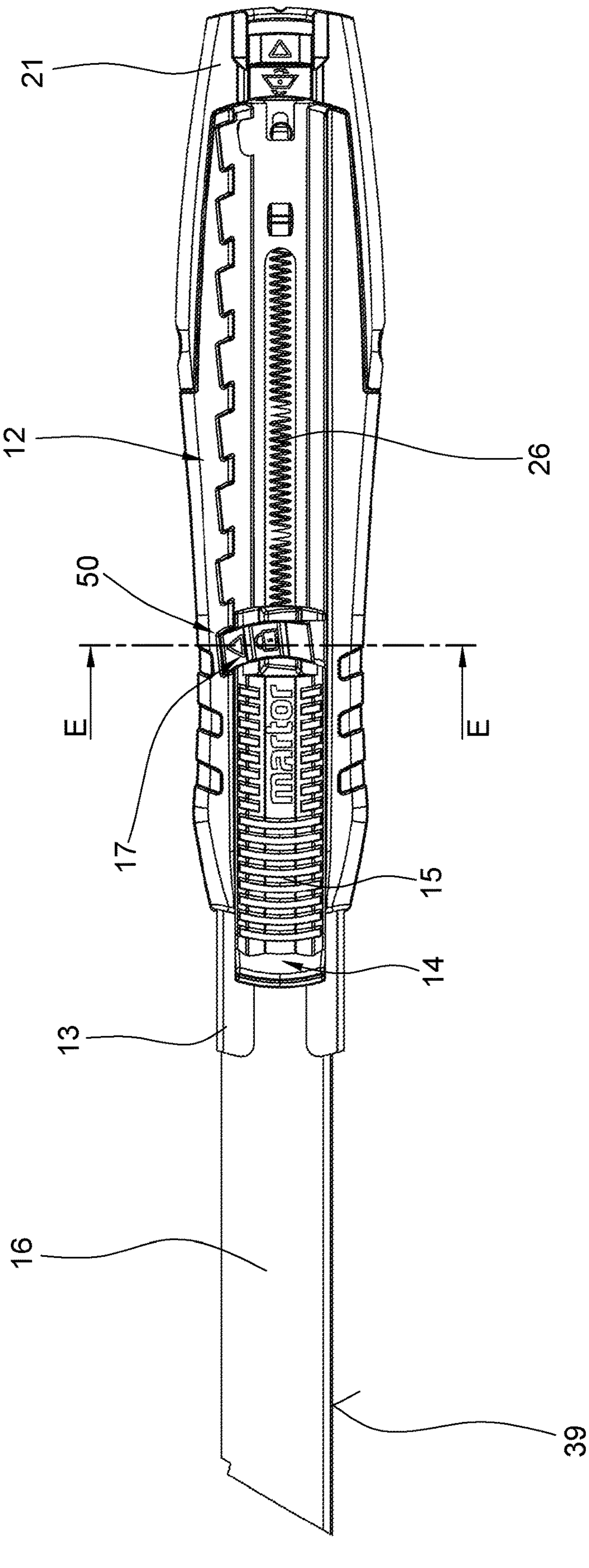
FIG. 5 shows a side view according to FIG. 4, wherein the locking device is in the latch position.

The function of the knife 10 will be described in the following. To move the blade 16 from the safety position according to FIG. 1 to any cutting position, the latch 31 must be moved to the release position and the blade carrier 14 must be moved against the spring force of the spring 26 in the direction x1 until, for example, one of the positions according to FIG. 2 or FIG. 4 is reached. Then the latch 31 can be adjusted in the direction y2 to the latch position by moving it into engagement with a recess 32.

Since the recesses 32 can be seen by the user, it can also be visually determined whether the latch 31 is in the latch position. In addition, the user receives haptic feedback when the pressure piece 33 moves down the step 43 when the latch 31 is moved from the release position to the latch position.

In order to be able to change the blade, the blade carrier 14 is first moved to the safety position as shown in FIG. 1 and the latch 31 is moved to the latch position. The blade 16 is then received in the guide rail 13 of the housing 11 in such a way that the user cannot come into contact with the cutting edge 39. The housing latch 22 is opened and the closing part 21 is swivelled away relative to the housing 11 so that the rear opening 56 of the guide rail 13 is no longer blocked by the closing part 21.

The blade carrier 14 can then first be unlocked by moving the latch 31 to the release position and then removed from the guide rail 13 via the rear opening 56 (see FIG. 10). Since the driving surface 58 of the blade carrier 14 and the driver 53 of the carriage 29 constitute coupling elements that readily allow the driving surface 58 to be disengaged from the driver 53 in the direction x2, the blade carrier 14 can be removed from the housing 11 while the carriage 29 remains attached to the housing 11. The driver 53 is moved by the spring 26 to the end region 61 of the slot 54.

After changing the blade, assembly is carried out in reverse order, wherein the blade carrier 14 with the blade 16 is inserted into the guide rail 13 and the latch 31 is moved into the latch position. The closing part 21 is then swivelled back into a closed position in which the rear opening 56 is blocked. The housing latch 22 automatically latches onto the housing 11 in the closed position. The knife is then ready for use again.

The invention claimed is:

1. A knife, comprising: a housing; a blade carrier, in which a blade is fastenable, the blade carrier being movable in the housing between a safety position in which the blade carrier is arranged in a rear position so that the blade does not project beyond the housing and at least one cutting position in which the blade projects beyond the housing; and a spring mechanism arranged between the housing and the blade carrier so as to load the blade carrier into the safety position, wherein the blade carrier comprises first locking means releasably engageable with second locking means on the housing to lock the blade carrier in the safety position and/or the at least one cutting position, further comprising an actuator, wherein the housing comprises a slot-like lateral opening that extends parallel to a direction of movement of the blade carrier, wherein the second locking means are arranged adjacent to the lateral opening and offset in the direction of movement of the blade carrier.

2. The knife according to claim 1, wherein the first locking means includes at least one latch movable between a latch position and a release position.

3. The knife according to claim 1, wherein the second locking means comprise at least one latch seat.

4. The knife according to claim 1, wherein the housing forms guide means for guiding the blade carrier.

5. The knife according to claim 1, wherein the housing comprises a guide rail in which the blade carrier is guided.

6. The knife according to claim 5, wherein the housing comprises a sleeve region in which the guide rail is at least partially received.

7. The knife according to claim 6, wherein the second locking means are formed in the sleeve region or in the guide rail.

8. The knife according to claim 6, wherein the guide rail is a metal part.

9. A knife, comprising: a housing; a blade carrier, in which a blade is fastenable, the blade carrier being movable in the housing between a safety position in which the blade carrier is arranged in a rear position so that the blade does not project beyond the housing and at least one cutting position in which the blade projects beyond the housing; and a spring mechanism arranged between the housing and the blade carrier so as to load the blade carrier into the safety position, wherein the blade carrier comprises first locking means releasably engageable with second locking means on the housing to lock the blade carrier in the safety position and/or the at least one cutting position, wherein the first locking means includes at least one latch movable between a latch position and a release position, wherein the latch is guided on a curved path.

10. A knife, comprising: a housing; a blade carrier, in which a blade is fastenable, the blade carrier being movable in the housing between a safety position in which the blade carrier is arranged in a rear position so that the blade does not project beyond the housing and at least one cutting position in which the blade projects beyond the housing; and a spring mechanism arranged between the housing and the blade carrier so as to load the blade carrier into the safety position, wherein the blade carrier comprises first locking means releasably engageable with second locking means on the housing to lock the blade carrier in the safety position and/or the at least one cutting position, further comprising a securing device configured to lock the first locking means.

11. The knife according to claim 10, wherein the securing device comprises a pressure piece connected to the blade carrier so as to be movable and loaded by spring means against a securing surface of the blade carrier.

12. The knife according to claim 11, wherein the securing surface includes at least one positioning region for the pressure piece.

13. The knife according to claim 12, wherein the at least one positioning region includes a first position region separated from a second position region by a step that must be overcome during movement between the first position region and the second position region.

14. The knife according to claim 12, wherein the pressure piece is a metal part.

* * * * *